(12) United States Patent
Lau

(10) Patent No.: US 8,899,974 B2
(45) Date of Patent: Dec. 2, 2014

(54) PARTICULATE MITIGATING PROPELLANT MANAGEMENT TANK DEVICE

(75) Inventor: Kenneth H. Lau, La Crescenta, CA (US)

(73) Assignee: The Aerospace Corporation, El Segundo, CA (US)

( * ) Notice: Subject to any disclaimer, the term of this patent is extended or adjusted under 35 U.S.C. 154(b) by 1204 days.

(21) Appl. No.: 11/901,945

(22) Filed: Sep. 19, 2007

(65) Prior Publication Data

US 2009/0075222 A1    Mar. 19, 2009

(51) Int. Cl.
*F23D 14/00* (2006.01)
*F02K 9/60* (2006.01)

(52) U.S. Cl.
CPC ............. *F02K 9/605* (2013.01); *F05D 2250/14* (2013.01); *F05D 2300/133* (2013.01); *F05D 2250/71* (2013.01)
USPC ........... 431/344; 431/241; 431/298; 210/745; 210/85

(58) Field of Classification Search
USPC ............ 431/344, 241, 298; 210/745, 85, 808; 197/590, 549, 582, 154; 222/168, 144, 222/330
See application file for complete search history.

(56) References Cited

U.S. PATENT DOCUMENTS

| | | | | |
|---|---|---|---|---|
| 2,834,517 | A * | 5/1958 | Townsley | 222/168 |
| 3,854,905 | A * | 12/1974 | Balzer et al. | 96/220 |
| 3,988,132 | A * | 10/1976 | Oranje | 55/399 |
| 4,089,741 | A * | 5/1978 | Patterson et al. | 376/439 |
| 4,768,674 | A * | 9/1988 | Prescott | 220/719 |
| 4,898,030 | A * | 2/1990 | Yeh | 73/290 V |
| 4,901,762 | A * | 2/1990 | Miller et al. | 137/574 |
| 5,293,895 | A * | 3/1994 | Grove et al. | 137/154 |
| 6,014,987 | A * | 1/2000 | List et al. | 137/549 |
| 7,395,832 | B2 * | 7/2008 | Behruzi et al. | 137/154 |

* cited by examiner

*Primary Examiner* — Avinash Savani
(74) *Attorney, Agent, or Firm* — Paul D. Chancellor; Ocean Law

(57) ABSTRACT

A propellant management device comprising a plurality of insert vanes with respective outwardly extending curved flanges is disposed in a propellant tank with the curved flanges having mating contact along contacting lines on the interior of the tank as the insert vanes serves to wick fuel within the tank with reduced particulate generation within the tank for improved reliability and use of the propellant tank.

12 Claims, 2 Drawing Sheets

PROPELLANT TANK INSERT

PRIOR ART FUEL TANK

PROPELLANT TANK INSERT

MID TANK CROSS SECTION VIEW
OF THE PROPELLANT TANK INSERT

TOP DOWN VIEW OF THE PROPELLANT TANK INSERT

PARTICULATE MITIGATING PROPELLANT MANAGEMENT TANK DEVICE

STATEMENT OF GOVERNMENT INTEREST

The invention was made with Government support under contract No. FA8802-04-C-0001 by the Department of the Air Force. The Government has certain rights in the invention.

FIELD OF THE INVENTION

The invention relates to the field of propellant tanks including tank wicks and particulate management devices. More particularly, the invention relates to an internal wick device that reduces particulate generation within a tank.

BACKGROUND OF THE INVENTION

Referring to FIG. 1, propellant fuel tanks have long been used. Fuel tanks are comprised of a fuel tank top dome, a fuel tank body, and fuel tank bottom dome. The body is a cylindrical body. Each of the domes typically includes a semispherical top and short cylindrical section. The two cylindrical sections are respectively mated to opposing ends of the cylindrical body. As such, the interior of the fuel tank defines an oval cavity in which fuel is disposed.

Such a fuel tank suffers from the problem of wicking remaining residual amounts of fuel left in the tank after much of the fuel has been expended. As such, wicks have been disposed inside the tank to provide surface tension forces. Traditionally, the wicks are designed for each specific mission scenario and tank size. As a result, propellant management devices (PMDs) can be found in numerous sizes and configurations. The wicks for one approach assume the internal oval shape of the tank to provide gas free propellant delivery. Two oval shaped wicks are used. The wicks may be plated wicks. Each oval shape wick has an oval perimeter and a centered oval aperture. Two oval wicks are coupled together at 90° forming four half-oval portions. The two oval wicks are coupled and function as an integrated wick. The two oval wicks are known as insert vanes. The exterior edges of each of the four half-oval portions abut internal sides of the body and domes along four abut at times the tank interior along four respective contacting lines that are 90° apart. Each of the four respective contacting lines extends from the center of the top dome to the center of the bottom dome. Each contacting line touches the sides of the tanks to wick fuel.

The wick is considered a propellant management device. The wick usually is internally attached at both ends of the tank while the four half-oval portions are free to move within the tank. The wick is originally designed with a length to match a stretched tank when the tank is filled with fuel or pressurized, and when the half-oval portions touch the interior of the tank along the contacting lines. However, when the tank is empty, the tank shrinks a small amount causing the half-oval portions to bend and sag within the tank. Any motion of the tank when the tank is not fully pressurized will cause the half-oval portion to wiggle around within the tank when the contacting lines are no longer maintained. Transportation, handling, and general movement of a propellant tank can cause the wick to move within the tank. The result of the wick motions is particulates generated between the edges of the wick and the tank interior surface. The amount of the particulates can be quite large, thus potentially clogging the tank outlet.

To avoid failures, particulate filters may be deployed in the plumbing associated with the tank outlet. The particulates could also plug up thrusters in rocket engines. Particulate clogging valves during fuel dispensing as well as other plumbing associated with dispensing the fuel from or into the tank. To avoid the effects of accumulated particulates, the tanks are typically flushed and cleaned prior to reuse. Particulate contamination may lead to propulsion system failures, and the need for excessive cleaning due to internal tank particulate contamination. These and other disadvantages are solved or reduced using the invention.

SUMMARY OF THE INVENTION

An object of the invention is to provide a fuel wick in a propellant tank for wicking fuel within the tank.

Another object of the invention is to provide a fuel wick in a propellant tank for wicking fuel within the tank with reduced particulate contamination.

Yet another object of the invention is to provide a fuel wick having curved flanges in a propellant tank for wicking fuel within the tank with reduced particulate contamination.

Still another object of the invention is to provide a fuel wick having four half-oval portions with respective curved flanges touching the interior sides in a propellant tank for wicking fuel within the tank with reduced particulate contamination.

The invention is directed to a propellant tank wick having curved edges abutting the interior side of the tank for reducing particulate generation and fuel contamination. Discovery is made that moving wicks can cause particulate contamination with a fuel tank. The discovered heretofore unknown problem of particulate generation by wick scratching results from an exterior edge of the wick making moving contact with the interior sides of a moving tank. The edges of the wick particulate generation. Prior wick designs lead to fuel tank failures, and the need for additional cleaning due to internal tank particulate generation caused by a moving internal wick. A moving wick may scratch the internal side of the tank, or the wick may become frayed, both leading to particulate generation. Particulate contamination in a fuel tank may lead to tank failure by either failing to wick all of the fuel, or by clogging fuel dispensing valves and other plumbing associated with dispensing the fuel from or into the tank. By curving the edges of the half-oval wick portions, scratching is minimized when the tank is moved, and consequently, particulate generation is minimized reducing the need for filtering and cleaning while improving failure rates associated with dispensing pluming and clogged fueled engines. These and other advantages will become more apparent from the following detailed description of the preferred embodiment.

DETAILED DESCRIPTION OF THE PREFERRED EMBODIMENT

Figure 1:
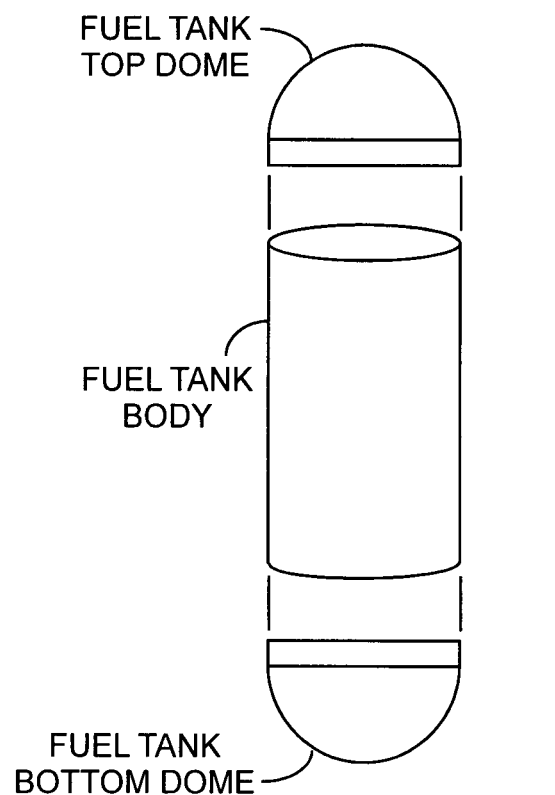
FIG. 1 depicts a prior art fuel tank.
Figure 2:
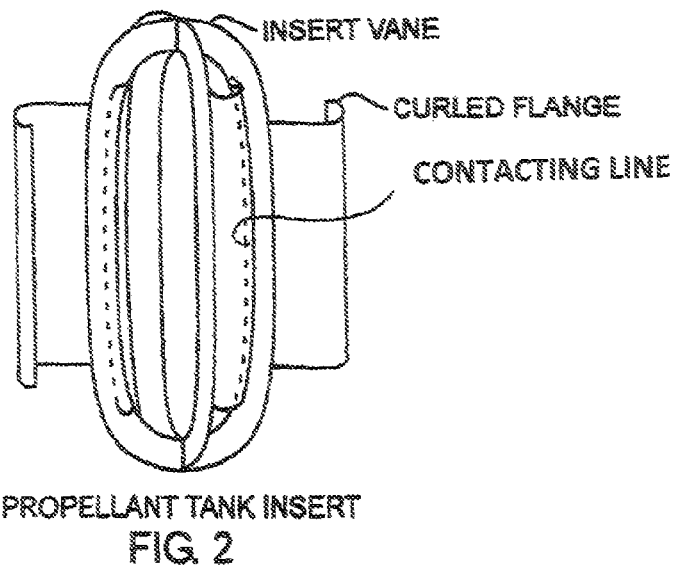
FIG. 2 depicts a propellant tank insert.

An embodiment of the invention is described with reference to the figures using reference designations as shown in the figures. Referring to FIGS. 1 and 2, a propellant tank insert includes two insert vanes coupled together at 90°. Each insert vane is an oval wick having an oval aperture. The oval perimeter of an insert vane matches an oval interior of a fuel tank. The insert vanes are attached to top and bottom dome ends of the fuel tank. The two insert vanes coupled at 90° form four half-oval portions. Each of the four half-oval portions has a curled flange extending outward from the perimeter of the four half-oval portions. The insert vanes are preferably wicks extending the entire length of the tank for maximum wicking.

Figure 3A:
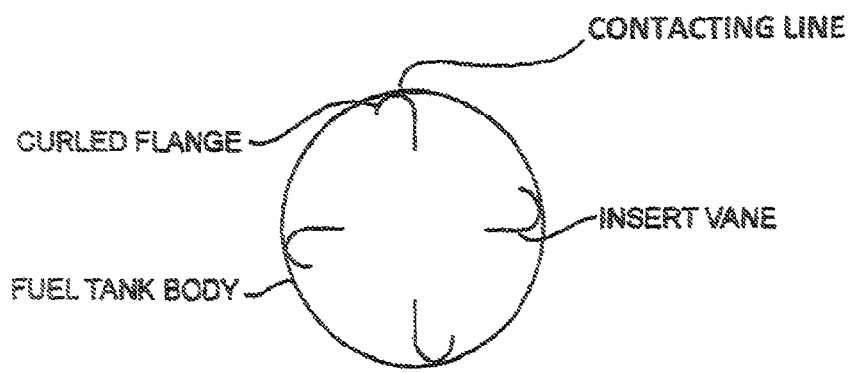
FIG. 3A is a mid tank cross section view of the propellant tank insert.
Figure 3B:
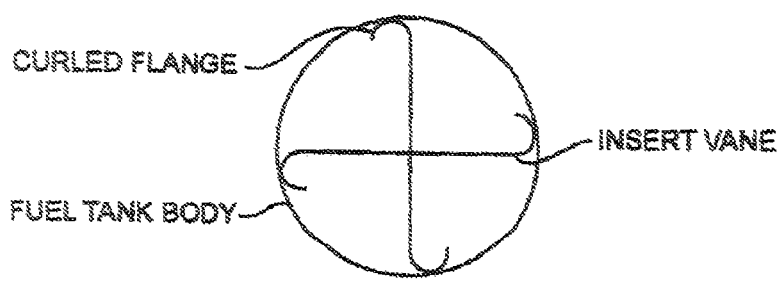
FIG. 3B is a top down view of the propellant tank insert.

Referring to all of the Figures, and more particularly to FIGS. 3A and 3B, the curled flanges are sized to make abutting contact with the interior of the tank along four respective four contact lines running vertically along the interior surface elongated length of the tank. The curled flanges have a length preferably extending at least the length of a cylindrical body portion of the tank. The four curled flanges have sufficient extension, rigidity, and flexibility to maintain contact with the tank body along the four contacting lines even when the tank is not fully pressurized. The flanges effectively provide a spring action for maintaining the contact along the contacting lines. The spring action exerts light pressure and curved ends of the flanges serve to minimizing scratches, particulate generation, and fuel contamination as the flanges rub against the interior surface of the tank when the tank is moved or shaken. The curved flanges are void of sharp edges and burrs. The spring action is sized so that the flanges do not cause dents in or scratches on the tank shell body.

The new insert vanes can be made of the same construction as the ones without the curve flanges. Typically, it is the same material as the tank walls, thus in the case of a titanium tank, the wick vanes and flanges would also be titanium. All construction parameters would be identical as the old construction, e.g. the widths, lengths, heights, aperture sizes, material, material processes, dome connection, manufacturing process, etc. The addition is the incorporation of additional material, titanium in this case. When the titanium sheet is cut or stamped to the oval shape, it would now be stamped with a long tab that will eventually be rolled to form the curled flange. The flange will be as tall as the straight body section of the tank, and will be long enough to provide a curved smooth interface to the interior tank surface of approximately nine inches. Such curved flanges would provide an approximately three inches in diameter after assembly. The titanium material should have enough compliance that when the assembled propellant tank insert is slid into the tank, the curled flange will be formed automatically upon insertion. A before assembly. As with any custom design, the exact dimension of the vanes, including the curled flanges, will be sized to the particular tank.

The invention is directed to insert vanes having respective outwardly extending curved flanges for mating contact with the interior of the tank along respective contacting lines for reduced particulate generation, scratching, and denting of the tank. The inserts preferably function as wicks for the moving fuel toward a dispensing valve for dispensing the fuel from the tank. While only four half-oval insert vanes are shown, any plural number of such half-oval insert vanes can be used. Those skilled in the art can make enhancements, improvements, and modifications to the invention, and these enhancements, improvements, and modifications may nonetheless fall within the spirit and scope of the following claims.

What is claimed is:

1. An insert for insertion in a tank, the tank having a top end, a bottom end, and a body extending between the top end and the bottom end, the tank having an internal surface, the insert comprising,
insert vanes for disposing in the tank, the insert vanes having respective curled outer edges,
the curled outer edges abutting the interior surface along at least a portion of the body along respective contacting lines,
wherein the insert vanes form a fuel wick, and
wherein, the insert vanes form a top end and bottom end for attachment within the tank at the top end and bottom end of the tank.

2. The insert of claim 1 wherein,
two insert vanes of the insert vanes form intersecting oval apertures.

3. The insert of claim 1 wherein,
two insert vanes of the insert vanes have oval perimeters and are integrally made forming intersecting oval apertures.

4. A tank, the tank comprising,
a top end,
a bottom end,
a body, the top end and bottom end and body defining an interior surface of the tank,
insert vanes disposed in the tank, the insert vanes having outer curled edges,
the curled edges mating to the interior surface of the tank along at least a portion of the body, along respective contacting lines,
there are four insert vanes disposed at 90° respecting each other,
there are four curled edges, and
there are four contacting lines.

5. A tank, the tank comprising,
a top end,
a bottom end,
a body, the top end and bottom end and body defining an interior surface of the tank,
insert vanes disposed in the tank, the insert vanes having outer curled edges,
the curled edges mating to the interior surface of the tank along at least a portion of the body, along respective contacting lines, and
each two insert vanes of the insert vanes has an oval perimeter and is integrally made forming intersecting oval apertures, the oval vane perimeter having a shape mating an oval interior shape of the tank.

6. A tank, the tank comprising,
a top end,
a bottom end,
a body, the top end and bottom end and body defining an interior surface of the tank,
insert vanes disposed in the tank, the insert vanes having outer curled edges,
the curled edges mating to the interior surface of the tank along at least a portion of the body, along respective contacting lines,
the top end is a dome,
the bottom end is a dome,
the body is a cylinder, and
the interior surface is an oval interior surface.

7. A fuel tank having a fuel wick insert comprising,
a tank having a top end, a bottom end, and a cylindrical body extending therebetween, the tank having an internal surface,
insert vanes disposed within the tank, the insert vanes having curled outer edges,
the curled outer edges abutting the tank interior surface along at least a portion of the tank body along respective contacting lines, and
two insert vanes arranged to create intersecting oval apertures.

8. A tank particulate reduction method comprising the steps of,
   providing a cylindrical tank body, a tank top and a tank bottom,
   providing a wick of insert vanes,
   curling opposed edges of a plurality of insert vanes,
   positioning the insert vanes within the tank,
   abutting sidewalls of the tank with the curled edges of the insert vanes,
   arranging two insert vanes to create intersecting oval aperture, and
   reducing the particulate generated at the interface between the tank and the insert vanes.

9. The method of claim 8 further comprising the step of reducing particulate generated at the interface between the tank and the insert vanes when the partially filled tank is transported during non-space flight by designing the insert vanes such that the curled edges of the insert vanes maintain contact with the tank sidewalls when the tank is partially filled.

10. A tank with internals comprising:
    a tank top end and a tank bottom end;
    a tank body extending between the tank ends;
    the tank having an internal surface;
    an insert within the tank;
    the tank insert including hoop shaped insert vanes;
    wherein the vanes have curled outer edges slidably engaging the internal surface; and,
    at the ends of the tank, uncurled portions of the vane edges.

11. The apparatus of claim 10 further comprising:
    peripheral lines described by the curled edges; and,
    the peripheral lines extending between the tank ends.

12. The apparatus of claim 11 further comprising:
    interengagement of plural vanes at one end of the tank.

* * * * *